(12) United States Patent
Nakasuji et al.

(10) Patent No.: US 9,094,566 B2
(45) Date of Patent: Jul. 28, 2015

(54) SIGNAL PROCESSING CIRCUIT, IMAGING DEVICE, AND PROGRAM

(71) Applicant: Sony Corporation, Tokyo (JP)

(72) Inventors: Motohiro Nakasuji, Kanagawa (JP); Seiji Kawa, Kanagawa (JP); Takeshi Oka, Kanagawa (JP)

(73) Assignee: SONY CORPORATION (JP)

( * ) Notice: Subject to any disclaimer, the term of this patent is extended or adjusted under 35 U.S.C. 154(b) by 72 days.

(21) Appl. No.: 14/072,186

(22) Filed: Nov. 5, 2013

(65) Prior Publication Data

US 2014/0132809 A1    May 15, 2014

(30) Foreign Application Priority Data

Nov. 12, 2012 (JP) ................. 2012-248056

(51) Int. Cl.
*H04N 9/09* (2006.01)
*H04N 9/04* (2006.01)
*H04N 5/225* (2006.01)

(52) U.S. Cl.
CPC ............. *H04N 9/045* (2013.01); *H04N 5/2258* (2013.01); *H04N 2209/048* (2013.01); *H04N 2209/049* (2013.01)

(58) Field of Classification Search
CPC .................. H04N 2209/048; H04N 2209/049; H04N 5/2258
USPC ......................................................... 348/265
See application file for complete search history.

(56) References Cited

U.S. PATENT DOCUMENTS

| 5,541,648 | A  | * | 7/1996 | Udagawa et al. | .......... 348/222.1 |
| 5,726,709 | A  | * | 3/1998 | Kinoshita et al. | ............. 348/264 |
| 7,768,566 | B2 | * | 8/2010 | Monroe | ................... 348/333.05 |
| 7,782,364 | B2 | * | 8/2010 | Smith | ........................ 348/218.1 |

FOREIGN PATENT DOCUMENTS

JP     2006-94194 A    4/2006

* cited by examiner

*Primary Examiner* — Sinh Tran
*Assistant Examiner* — Mark Monk
(74) *Attorney, Agent, or Firm* — Sheridan Ross P.C.

(57) ABSTRACT

Provided is a signal processing circuit including an image processing unit that performs, at an early stage, a process common to first image signals input using a predetermined number of signal lines in correspondence with first image sensors having a first pixel array and second image signals input using a number of signal lines and commonly used to input the first image signals in correspondence with second image sensors having a second pixel array, and performs specific processes specific to the first and second image signals at a later stage, a conversion unit that converts the second image signals subjected to the specific process according to a format of the first image signals, and a selection unit that selects one of the first image signals subjected to the specific process and the converted second image signals and outputs the selected image signals using the predetermined number of signal lines.

6 Claims, 7 Drawing Sheets

SIGNAL PROCESSING CIRCUIT, IMAGING DEVICE, AND PROGRAM

CROSS REFERENCE TO RELATED APPLICATIONS

This application claims the benefit of Japanese Priority Patent Application JP 2012-248056 filed Nov. 12, 2012, the entire contents of which are incorporated herein by reference.

BACKGROUND

The present disclosure relates to a signal processing circuit, an imaging device, and a program very suitable for application, for example, when an image signal output from a three-plate or single-plate type image sensor is processed.

In the past, imaging devices that capture three optical images decomposed by a prism using three image sensors (so-called three-plate type image sensors) disposed in correspondence with the three optical images have been known. Image signals corresponding to channels of red (R), green (G), and blue (B) in which the three-plate type image sensors are formed are subjected to processing such as gain adjustment or gamma correction, and then are output.

Imaging devices that use an image sensor (a so-called single-plate type image sensor) in which R, G, and B pixels are formed in a Bayer array have also been known. The single-plate type image sensor acquires image light of a subject via a color filter and outputs an image signal according to the intensity of the image light. Then, various processing units disposed at later stages of the image sensor perform predetermined processes on the image signal and a viewfinder or an external display device is caused to display an image.

Japanese Unexamined Patent Application Publication No. 2006-94194 discloses a technology for performing signal processing on pixel data obtained by image sensors in which color filter arraying schemes are different.

SUMMARY

In the past, however, a signal processing circuit (for example, a large scale integration (LSI)) corresponding to pixel arrays of both of the three-plate type and the single-plate type has not been known. However, there is a demand for mounting a signal processing circuit used for a single-plate type image sensor and a signal processing circuit used for three-plate type image sensors on one signal processing device. Consequently, mounting areas of the signal processing circuits corresponding to the image sensors may increase and the cost of development may increase.

It is desirable to provide a technology for efficiently processing image signals output from different image sensors having different pixel arrays.

According to an embodiment of the present disclosure, a process which is common to first image signals input using a predetermined number of signal lines in correspondence with first image sensors having a first pixel array and second image signals input using the number of signal lines different from the number of signal lines used to input the first image signals and commonly used to input the first image signals in correspondence with second image sensors having a second pixel array different from the first pixel array is performed at an early stage. Next, specific processes which are specific to the first image signals and the second image signals are performed at a later stage.

The second image signals subjected to the specific process are converted according to a format of the first image signals. One of the first image signals subjected to the specific process and the converted second image signals is selected and the selected image signals are output using the predetermined number of signal lines.

Thus, the process common to the first image signals and the second image signals is performed. Next, the specific process can be performed.

According to embodiments of the present disclosure, a circuit size can be reduced by suppressing an overall processing amount of the signal processing circuits that process image signals output from the different image sensors having the different pixel arrays.

DETAILED DESCRIPTION OF THE EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes (hereinafter, referred to as embodiments) for carrying out the present disclosure will be described. The description will be made in the following order. The same reference numerals are given to common constituent elements and the detailed description will be omitted.

1. Description of Premises
2. Embodiment (Example in Which Processing for Single-Plate Image and Three-Plate Image is Classified into Single-Channel Processing and Multi-Channel Processing)
3. Modification Example

1. Description of Premises

The present disclosers first examined the following.

Figure 6:
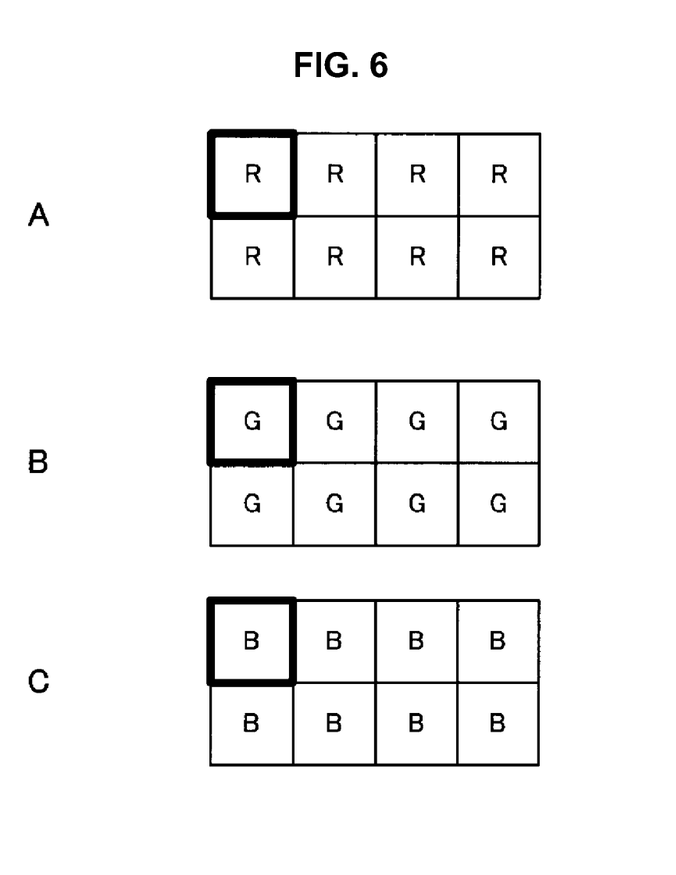
FIGS. 6A to 6C are diagrams illustrating examples of the structures of R, G, and B pixels in three-plate type image sensors.

FIGS. 6A to 6C are diagrams illustrating examples of the structures of R, G, and B pixels in three-plate type image sensors.

The three-plate type image sensors include R pixels illustrated in FIG. 6A, G pixels illustrated in FIG. 6B, and B pixels illustrated in FIG. 6C. The three-plate type image sensors have a configuration in which R, G, and B pixels of the same channel are arrayed on imaging surfaces of three image sensors (first pixel array example). That is, the three-plate type image sensors have a configuration in which color filters that transmit light (R, G, and B) with specific wavelength components in units of pixels are attached to the surface of the image sensors. For example, three types of filters that transmit only light with specific wavelengths of red (R), green (G), and blue (B) are disposed in front of the image sensors.

By configuring the three-plate type image sensors in this way, an image signal corresponding to one color of R, G, and B is output from one image sensor. In the following description of a (first image signal example), the R, G, and B image signals output from the three-plate type image sensors are referred to as "three-plate images." Further, reading units of image signals are assumed to be a range indicated by a thick frame in the drawings.

Figure 7:
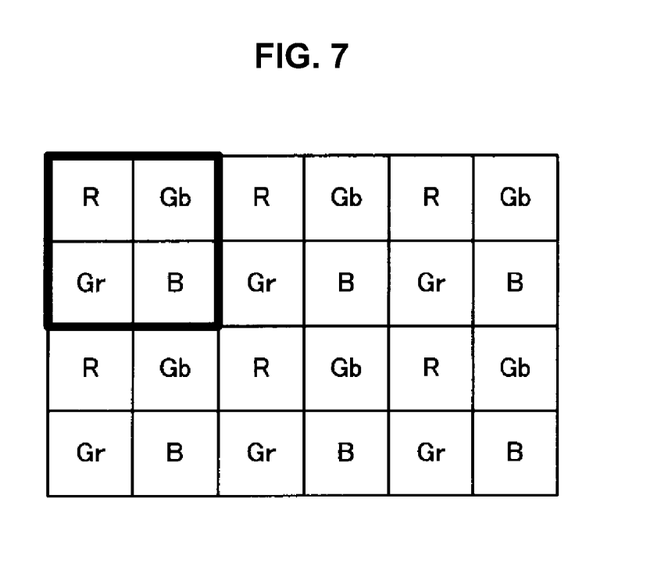
FIG. 7 is a diagram illustrating an example of the structure of pixels in a single-plate type image sensor.

FIG. 7 is a diagram illustrating an example of the structure of pixels in a single-plate type image sensor.

In the single-plate type image sensor, a color filter that has a Bayer array (second pixel array example) in which three types of filters transmitting light (R, G (Gb and Gr), and B) with specific wavelength components are arranged in a checked form is disposed in front of the image sensor. In addition, R, G (Gb and Gr), and B image signals (second image signal example) are simultaneously output from pixels disposed within a range surrounded by a thick frame. In the following description, R, G (Gb and Gr), and B image signals output from the single-plate type image sensor are referred to as "Bayer images."

In a process of generating a color image using an image signal output by each image sensor illustrated in FIGS. 6A to 6D and 7, necessary color components are restored by combining image signals output from a plurality of pixels.

Here, an example of the configuration of a processing block that processes an image signal output from each of the generally examined three-plate type image sensors and the single-plate type image sensor will be described with reference to FIGS. 8 and 9.

Figure 8:
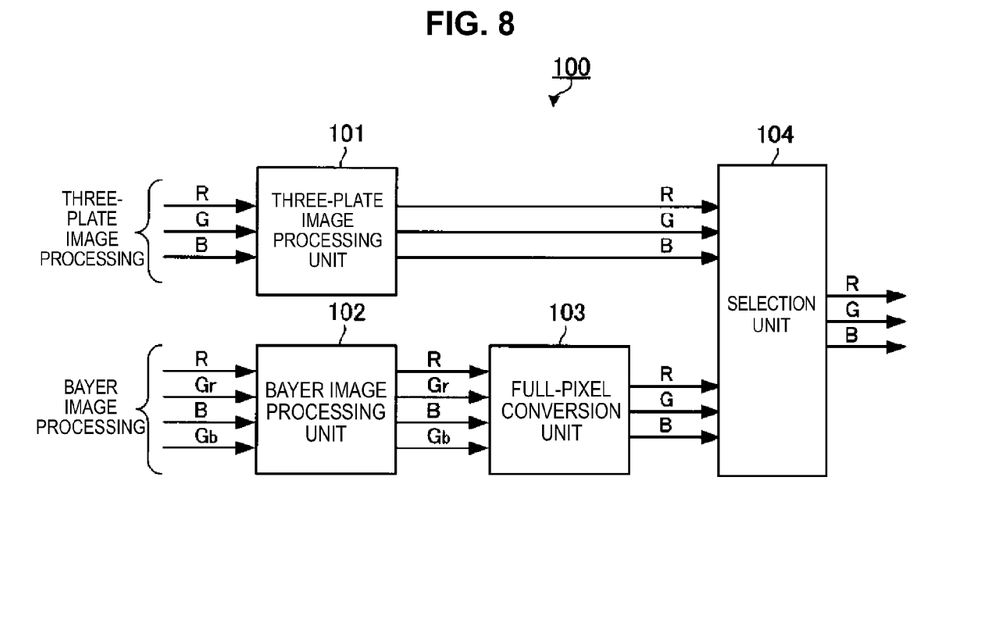
FIG. 8 is a diagram illustrating an example of the configuration of a signal processing circuit of the related art that selects and outputs images after separately performing three-plate image processing and Bayer image processing.

FIG. 8 is a diagram illustrating an example of the configuration of a signal processing circuit 100 of the related art that selects and outputs images after separately performing three-plate image processing and Bayer image processing.

The signal processing circuit 100 includes a three-plate image processing unit 101, a Bayer image processing unit 102, a full-pixel conversion unit 103, and a selection unit 104.

The three-plate image processing unit 101 performs signal processing on input three-plate images and outputs the processed three-plate images to the selection unit 104. The Bayer image processing unit 102 performs signal processing on input Bayer images, and then outputs the processed Bayer images to the full-pixel conversion unit 103. The full-pixel conversion unit 103 converts image signals output from pixels included in the Bayer images into image signals of a full-RGB form by interpolating the image signals (such a process is referred to as a full-pixel conversion process).

The image signals output by the full-pixel conversion unit 103 become three primary color signals of R, G, B. The selection unit 104 selects and outputs an image signal corresponding to one of the three-plate images or the Bayer images input to the signal processing circuit 100.

To configure the signal processing circuit 100 to which the three-plate images and the Bayer image illustrated in FIG. 8 are separately input in one signal processing circuit, it is necessary to provide double image processing units that perform the same process as a common process to be described below on the three-plate images and the Bayer images. Therefore, the size of the signal processing circuit 100 may not be reduced.

Figure 9:
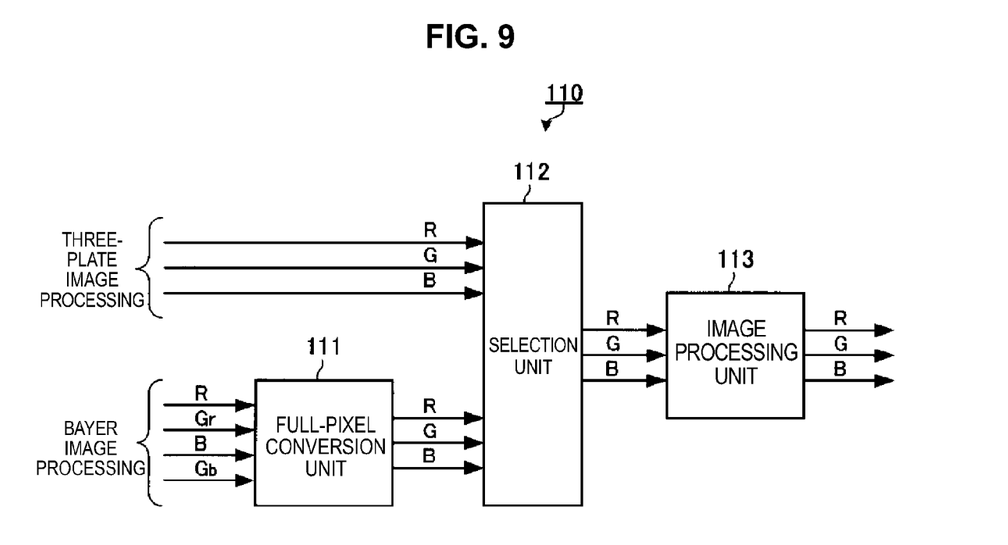
FIG. 9 is a diagram illustrating an example of the configuration of a signal processing circuit of the related art that performs a full-pixel conversion process at a previous stage.

FIG. 9 is a diagram illustrating an example of the configuration of a signal processing circuit 110 of the related art that performs a full-pixel conversion process at an earlier stage.

The signal processing circuit 110 includes a full-pixel conversion unit 111, a selection unit 112, and an image processing unit 113.

In the signal processing circuit 110 to which the three-plate images and the Bayer images are separately input, the three-plate images are input directly to the selection unit 112. The Bayer images are input to the selection unit 112 after the Bayer images are subjected to a full-pixel conversion process by the full-pixel conversion unit 111. Then, the selection units 112 selects the image signals to be output based on the three-plate images or the Bayer images input to the signal processing circuit 100. The image processing unit 113 performs a process, which is common to all of the three-plate images and the Bayer images, on the selected and output image signals.

Thus, in the signal processing circuit 110, a process after the selection unit 112 can be performed in common with a process performed by a signal processing circuit configured to process the three-plate images by performing the full-pixel conversion process on the Bayer image in the beginning. In the full-pixel conversion unit 111, an amount of processing on an image signal corresponding to each pixel may increase, and thus a circuit size may increase.

As the result of the above examination, the present disclosers devised a configuration and a process of an imaging device 1 according to an embodiment of the present disclosure to be described below. Here, how to perform a desired process while suppressing a circuit size of a signal processing circuit when three-plate images and Bayer images input to the signal processing circuit are processed will be described.

2. Embodiment

[Example in Which Processing for Single-Plate Image and Three-Plate Image is Classified into Single-Channel Processing and Multi-Channel Processing]

Hereinafter, an example of the configuration and an example of the process of an imaging device 1 according to an embodiment of the present disclosure will be described with reference to FIG. 1 to FIGS. 5A and 5B.

The imaging device 1 realizes a signal processing method performed by internal blocks to be described below in a cooperation manner when a computer executes a program. In this specification and the drawings, the same reference numerals are given to constituent elements having substantially the same functions or configurations and the repeated description will be omitted.

Figure 1:
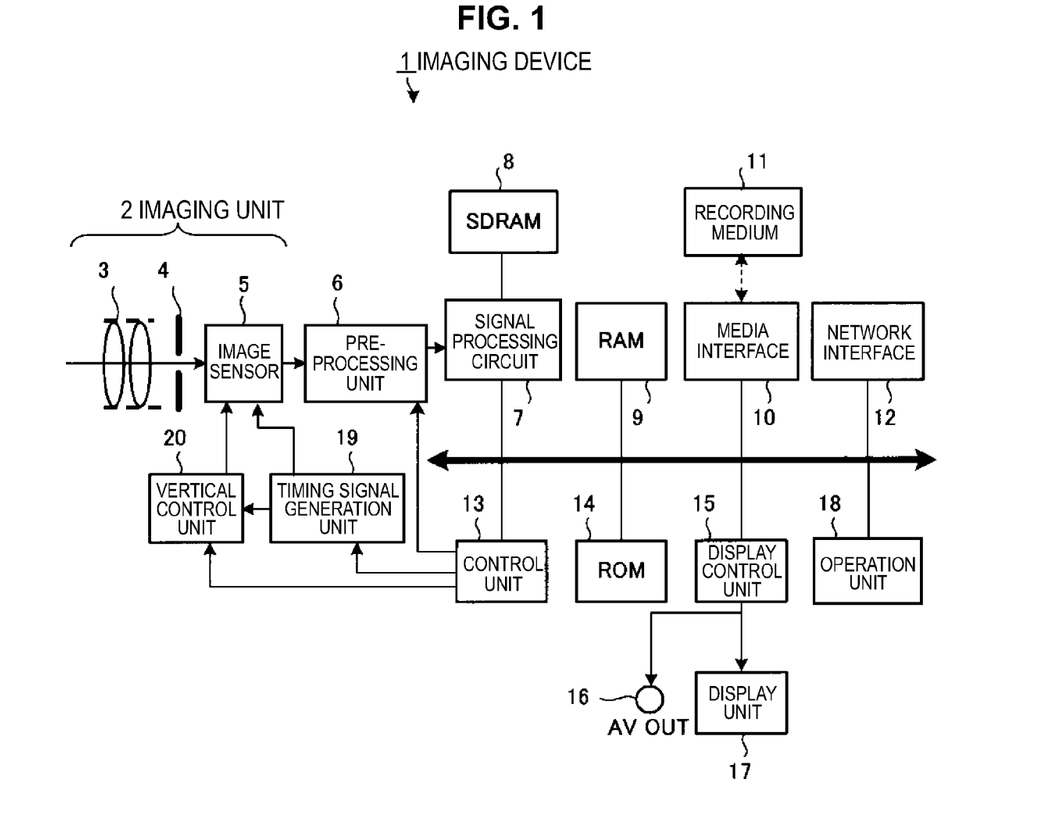
FIG. 1 is a block diagram illustrating an example of the internal configuration of an imaging device according to an embodiment of the present disclosure.

FIG. 1 is a block diagram illustrating an example of the internal configuration of the imaging device 1.

The imaging device 1 includes an optical system 3, an iris 4, an image sensor 5, and an imaging unit 2 that outputs three-plate images or Bayer images. The optical system 3 includes a plurality of lenses and transmits image light of a subject. The iris 4 adjusts a diaphragm of the image light transmitted through the optical system 3. The image sensor 5 generates and outputs an analog image signal from the image light formed on an imaging surface of the image sensor 5 via the optical system 3 and the iris 4. For example, a charge coupled device (CCD) imager or complementary metal oxide semiconductor (CMOS) sensor is used in the image sensor 5. In the image sensor 5, three-plate or single-plate type image sensors are used, as will be described below.

The imaging device 1 further includes a preprocessing unit 6 that amplifies the analog image signal input from the image sensor 5 and performs preprocessing to convert the analog image signal into a digital image signal and a signal processing circuit 7 that performs predetermined signal processing on the digital image signal output from the preprocessing unit 6. The preprocessing unit 6 outputs an image signal for one image selected among the three-plate image and the Bayer image from the input image signals to the signal processing circuit 7. The signal processing circuit 7 includes a synchronous dynamic random access memory (SDRAM) 8 used for image processing and appropriately writes or reads variables, parameters, or the like on or from the SDRAM 8.

The imaging device 1 includes a random access memory (RAM) 9 used as a work area in which various kinds of data are temporarily stored. The imaging device 1 includes a media interface 10 that controls recording or reading of a digital image signal on or from a recording medium 11 such as a flash memory detachably mounted on the imaging device 1. A general memory card is used in the recording medium 11. The imaging device 1 includes a network interface 12 that controls a process of outputting or acquiring an image to or from a computer device (not illustrated) connected via a USB cable or the like.

The imaging device 1 includes a control unit 13 that controls a process of each processing block and a ROM 14 that stores a program or the like. The imaging device 1 includes a display control unit 15 that displays a through image or an image read from the recording medium 11 on a display unit 17 based on a digital image signal and an image output unit 16 that is connected to the display control unit 15 and outputs a through image or the like to a monitor or the like connected to the outside. The imaging device 1 includes an operation unit 18 used for a user to perform an input operation using an instruction object. The display unit 17 has, for example, a size of 3 inches to 3.5 inches and a screen aspect ratio of 16:9.

The imaging device 1 includes a timing signal generation unit 19 that generates a timing signal used to synchronize with a process timing of each unit under the control of the control unit 13 and a vertical control unit 20 that controls vertical reading of the image sensor 5. The vertical control unit 20 reads an analog image signal from the image sensor 5 in synchronization with the timing signal supplied from the timing signal generation unit 19.

Next, a process of each unit of the imaging device 1 will be described.

When the user operates the operation unit 18 to start imaging, the control unit 13 causes the iris 4 to perform an iris process and causes the imaging unit 2 and the preprocessing unit 6 to start processes. A program operated by the control unit 13 is appropriately read from the ROM 14, a control parameter and the like are written on the RAM 9, and a process is performed.

An amount of the image light of the subject passing through the optical system 3 is adjusted by the iris 4 and the image light is formed as an image on the imaging surface of the image sensor 5. The image sensor 5 outputs an analog image signal according to the image light of the subject formed as the image on the imaging surface and the preprocessing unit 6 converts the analog image signal into a digital image signal. A timing at which the analog image signal is read from the image sensor 5 or a timing at which the preprocessing unit 6 outputs the digital image signal is controlled by the control unit 13.

When the signal processing circuit 7 receives the digital image signal from the preprocessing unit 6, the signal processing circuit 7 performs various correction processes such as a process of removing noise and a process of amplifying the digital image signal. Then, the digital image signal output via the media interface 10 is written and stored in the recording medium 11.

The signal processing circuit 7 outputs the digital image signal to the display control unit 15 and causes the display unit 17 to display a through image. The control unit 13 performs control to operate each unit according to an operation instruction input from the operation unit 18 or cause the display control unit 15 to display various kinds of information on the display unit 17. The control unit 13 outputs an image signal of the through image or an image signal read from the recording medium 11 to a monitor or the like connected to the image output unit 16. The control unit 13 reads an image signal instructed by a PC or the like connected to the network interface 12 from the recording medium 11 and outputs the image signal to the PC.

Figure 2:
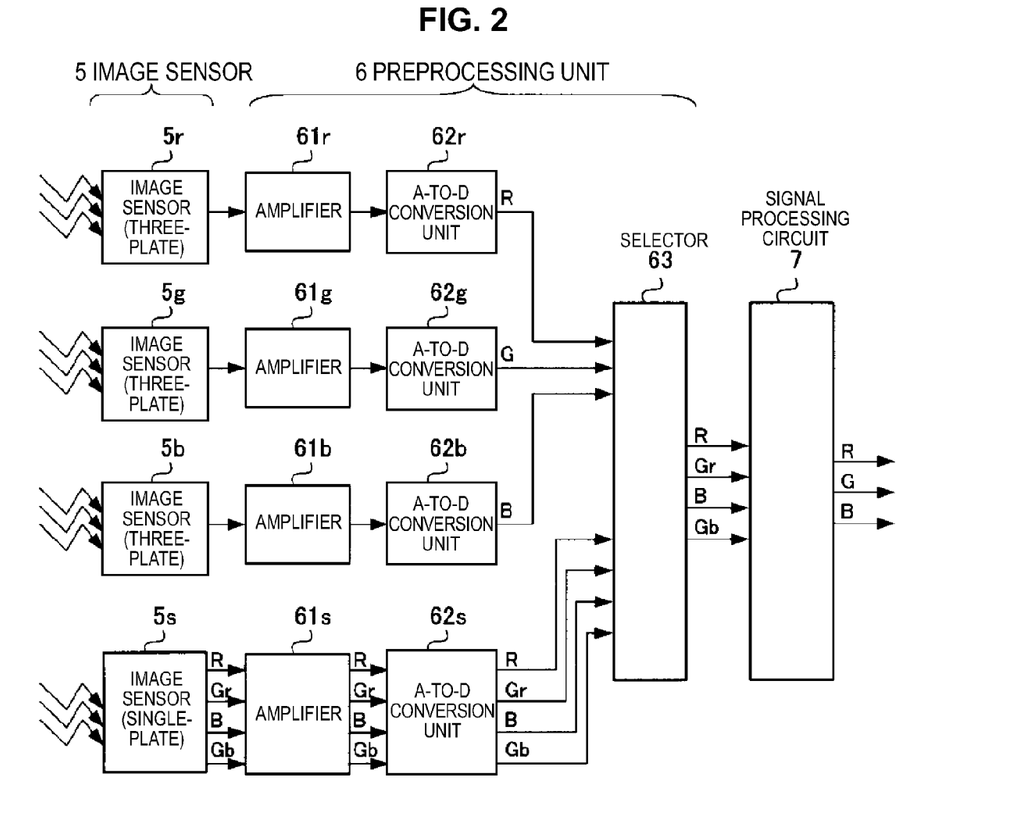
FIG. 2 is a block diagram illustrating an example of the internal configurations of an image sensor and a preprocessing unit according to the embodiment of the present disclosure.

FIG. 2 is a block diagram illustrating an example of the internal configurations of the image sensor 5 and the preprocessing unit 6.

The image sensor 5 includes three-plate type image sensors 5r, 5g, and 5b and a single-plate type image sensor 5s. The image sensors 5r, 5g, and 5b output R, G, and B analog image signals, which are three-plate images, by performing photoelectric conversion on the image light formed as the image on the imaging surface. The preprocessing unit 6 includes amplifiers 61r, 61g, and 61b and analog-to-digital conversion units 62r, 62g, and 62b in correspondence with the image sensors 5r, 5g, and 5b, respectively.

The image sensor 5s has a configuration of, for example, a Bayer array and outputs R, G (Gr and Gb), and B analog image signals, which are Bayer images, by performing photographic conversion on the image light formed as the image on the imaging surface. The preprocessing unit 6 includes an amplifier 61s, an analog-to-digital conversion unit 62s, and a selector 63 in correspondence with the image sensor 5s.

The preprocessing unit 6 performs preprocessing on first image signals (for example, R, G, and B digital image signals) output by first image sensors (image sensors 5r, 5g, and 5b) having a first pixel array. The preprocessing unit 6 performs the preprocessing on second image signals (for example, R, G (Gr and Gb), and B digital image signals) output by a second image sensor (image sensor 5s) having a second pixel array different from the first pixel array. An example of the preprocessing includes a process of amplifying analog image signals, converting the analog image signals into digital image signals, selecting the digital image signal input from one of the three-plate type image sensors 5r, 5g, and 5b and the single-plate type image sensor 5s, and outputting the selected digital image signal to the signal processing circuit 7. An example of a detailed process performed by the signal processing circuit 7 will be described below.

The analog image signals output by the image sensors 5r, 5g, and 5b are amplified by the amplifiers 61r, 61g, and 61b and are converted into the digital image signals quantized by the analog-to-digital conversion units 62r, 62g, and 62b. Likewise, the analog image signals output by the image sensor 5*s* are amplified by the amplifier 61*s* and are converted into the digital image signals quantized by the analog-to-digital conversion unit 62*s*.

The R, G, and B digital image signals, which are the three-plate images, are input and the Bayer images, which are the R, G (Gr and Gb), and B digital image signals, are input to the selector 63. Then, the selector 63 outputs the image signals selected so as to be suitable for the types of image sensors used in the imaging device 1 to the signal processing circuit 7.

In FIG. 2, four signal lines of R, G (Gr and Gb), and B are illustrated as outputs of the selector 63. For example, when the selector 63 selects the Bayer images, the R, G (Gr and Gb), and B digital image signals are loaded and output to the four signals lines of the selector 63, respectively. However, when the selector 63 selects the image signals corresponding to the three-plate type image sensors 5*r*, 5*g*, and 5*b*, the R, G, and B digital image signals are loaded and output to the three signal lines of R, Gr, and B, respectively, among the four signal lines of the selector 63. At this time, the signal line of Gb is not used.

Figure 3:
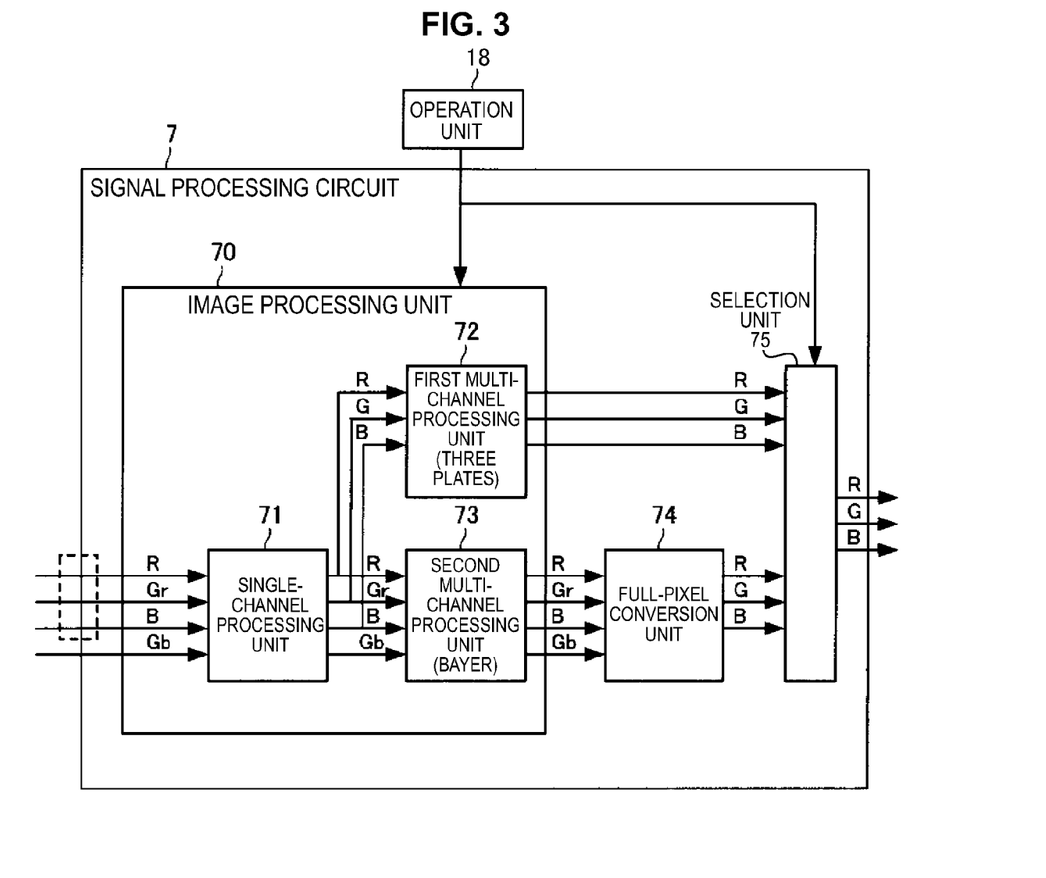
FIG. 3 is a block diagram illustrating an example of the internal configuration of a signal processing circuit according to the embodiment of the present disclosure.
Figure 4:
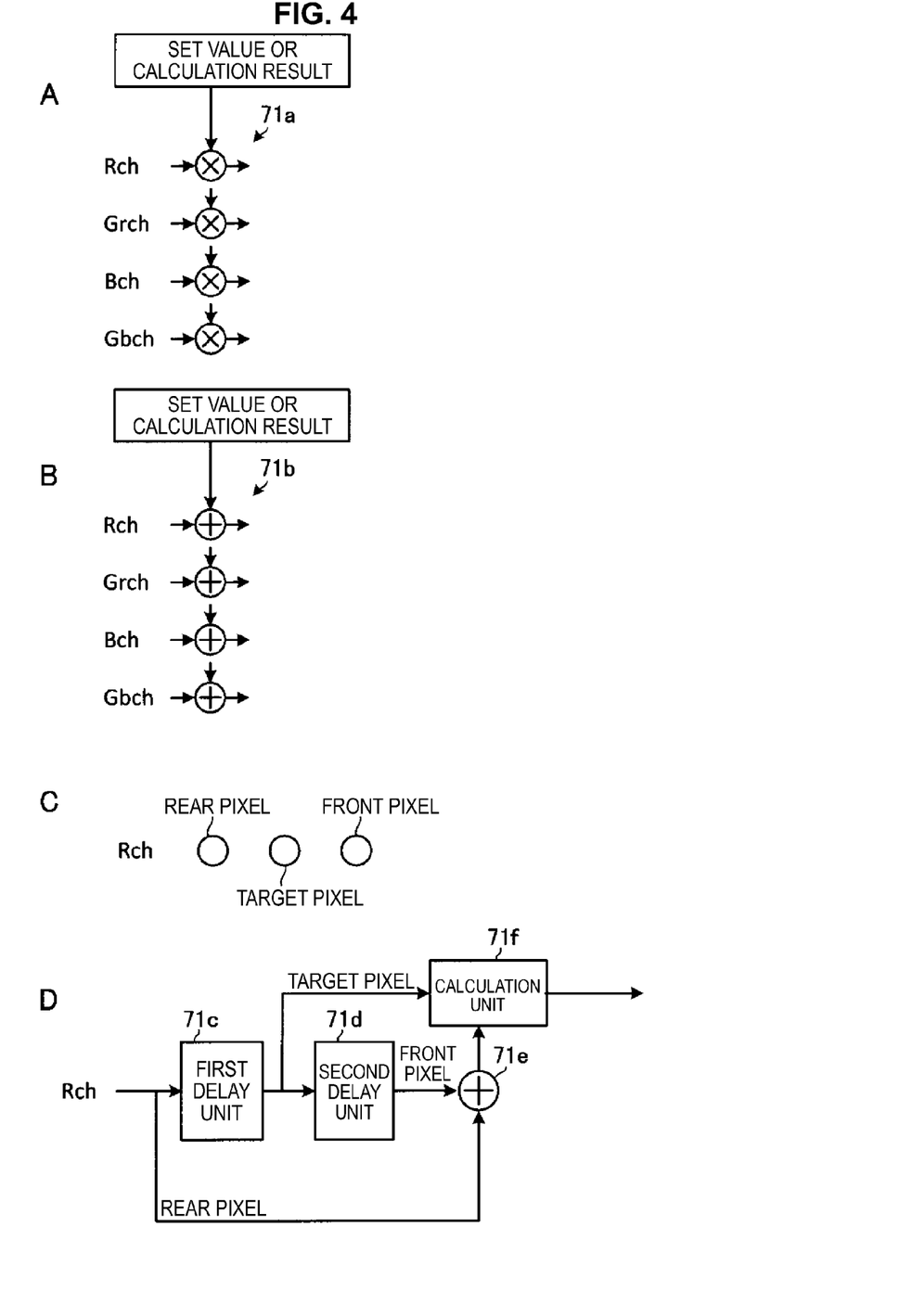
FIGS. 4A to 4D are diagrams illustrating details of image signal processing according to the embodiment of the present disclosure.
Figure 5:
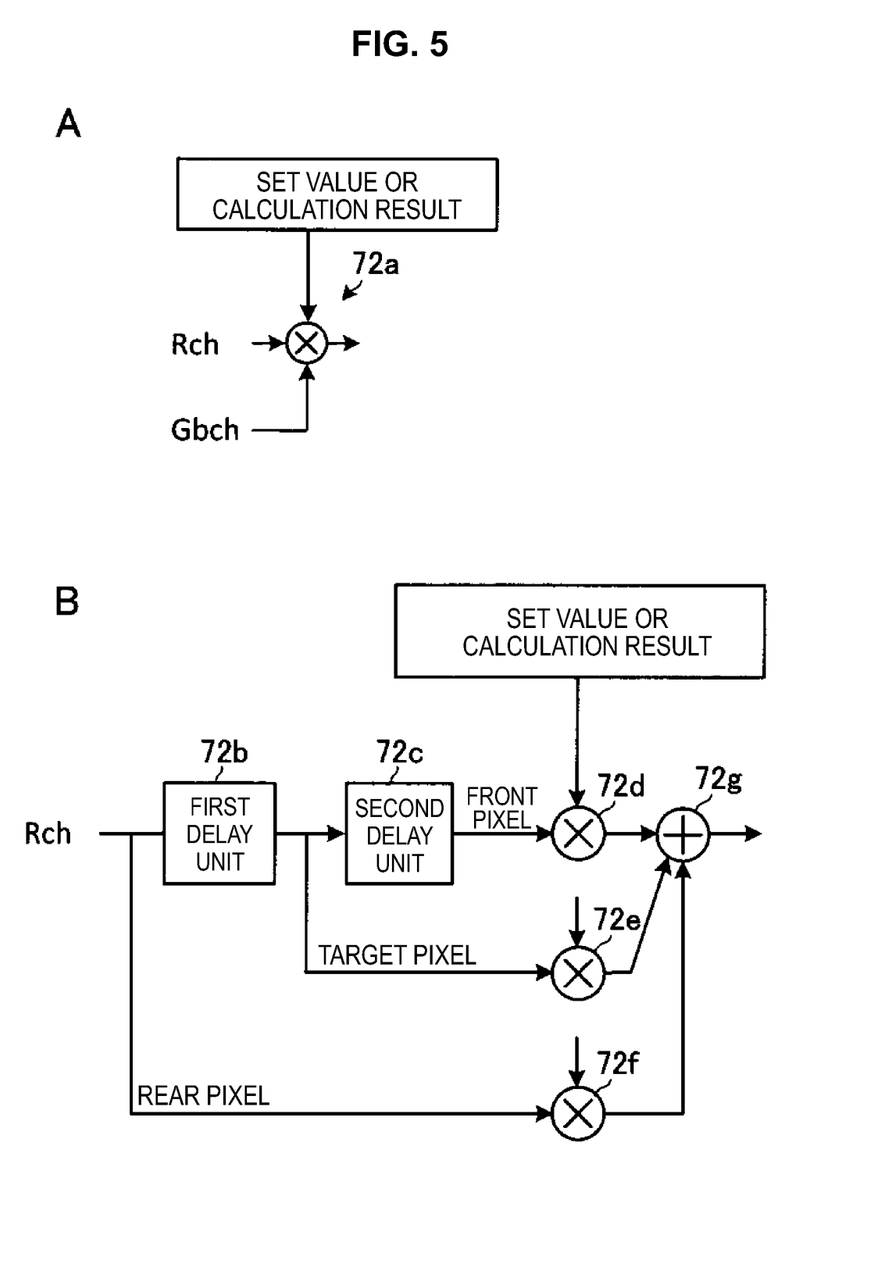
FIGS. 5A and 5B are diagrams illustrating details of image signal processing according to the embodiment of the present disclosure.

FIG. 3 is a block diagram illustrating an example of the internal configuration of the signal processing circuit 7 according to the embodiment.

The signal processing circuit 7 includes an image processing unit 70, a full-pixel conversion unit 74, and a selection unit 75. The image processing unit 70 includes a common processing unit (for example, a single-channel processing unit 71) that performs a common process, which is common to the first and second image signals, on each of the first and second image signals. The image processing unit 70 includes a first processing unit (for example, a first multi-channel processing unit 72) that performs a first process on the first image signals subjected to the common process and a second processing unit (for example, a second multi-channel processing unit 73) that performs a second process on the second image signals subjected to the common process.

The first multi-channel processing unit 72 performs the first process. As the first process, a process is performed by associating the first image signal (a target pixel to be described below) output by a specific pixel with the first image signal output by a peripheral pixel (a front pixel or a rear pixel to be described below) of the specific pixel or the first image signal in another channel is performed. The second multi-channel processing unit 73 performs, as the second process, a process by associating the second image signal output by a specific pixel with the second image signal output by a peripheral pixel of the specific pixel or the second image signal in another channel. The image processing unit 70 and the selection unit 75 are instructed in advance on which image signal from the operation unit 18 to process.

The first image signals (for example, the three-plate images) are input from the image sensors 5*r*, 5*g*, and 5*b* to the image processing unit 70 using a predetermined number of (for example, three) signal lines via the preprocessing unit 6. Further, the second image signals (for example, the Bayer images) are input from the image sensor 5*s* to the image processing unit 70 commonly using a number of (for example, four) signal lines different from the number of signal lines to which the first image signals are input. The image processing unit 70 performs a process common to the first and second image signals at an earlier stage and performs processes specific to the first image signals and the second image signals at a later stage. Then, a conversion unit (for example, the full-pixel conversion unit 74) converts the second image signals subjected to the specific process according to the format of the first image signals, a selection unit (for example, the selection unit 75) selects one of the first image signals subjected to the specific process and the converted second image signals, and the selected image signals are output using the predetermined number of (for example, three) signal lines.

The Bayer images or the three-plate images output by the preprocessing unit 6 are input to the signal processing circuit 7 of this example commonly using four signal lines. First, the signal processing circuit 7 performs the process common to the three-plate images and the Bayer images. Thereafter, the R, G (Gr and Gb), and B digital image signals of the Bayer images are converted into the R, G, and B image signals of the full pixels by the full-pixel conversion unit 74 and are input to the selection unit 75. The selection unit 75 selects and outputs the image signals input to the signal processing circuit 7 and subjected to a predetermined process.

Here, image signal processing performed by the image processing unit 70 will be described.

The image signal processing can be classified as follows according to the details of each process:

(Condition 1) processed using information regarding only a level direction which is not influenced by a peripheral pixel (addition and gain), (Condition 2) processed using information regarding only a single channel (signal color) among the input image signals, and (Condition 3) a space process and influenced by another channel (another pixel).

Since the number of Bayer images is one channel (Gb) larger than the number of three-plate images, the signal lines used to input the image signals to the signal processing circuit 7 are commonly used with the signal lines for the three-plate images. Here, a space phase differs between the three-plate images and the Bayer images, but the processing fit for one of the foregoing Conditions 1 and 2 is not influenced by a difference in the space phase and can be performed as a common process. For this reason, the processing of both Conditions 1 and 2 is performed at an earlier stage in the image processing unit 70 to perform the common process numerously and the processing of Condition 3 is performed at a later stage so that the circuit size of the signal processing circuit 7 can be reduced.

Here, specific examples of the common process and the specific process performed by the image processing unit 70 will be described.

FIGS. 4A to 4C are diagrams illustrating the details of the image signal processing performed by the single-channel processing unit 71. FIG. 4A illustrates an example in which the image signals are multiplied by a given gain. FIG. 4B illustrates an example in which a given value is added to the image signals. FIG. 4C illustrates an array example of the pixels of the same channel. FIG. 4D illustrates an example of the internal configuration of the single-channel processing unit 71 corresponding to an R channel.

The single-channel processing unit 71 performs a process of multiplying a gain or a process of adding a predetermined value on the first or second image signal output by the specific pixel to change a level of the first or second image signal. Signal processing is applied to each channel of the input first or second image signals in order. The single-channel processing unit 71 of this example processes the three-plate images or the Bayer images using the information regarding only the level direction described in Condition 1 and the information regarding only the single channel (single color) described in Condition 2.

As illustrated in FIG. 4A, a multiplication unit 71*a* is provided in the single-channel processing unit 71 to multiply the image signal of each channel input to the single-channel processing unit 71 by a given gain using a calculation result or a set value controlled by the control unit 13. Examples of a specific process include a white balance process, a mask gain process, and a shading correction process.

As illustrated in FIG. 4B, an addition unit 71b is provided in the single-channel processing unit 71 to add a given value to the image signal of each channel input to the single-channel processing unit 71 using a calculation result or a set value controlled by the control unit 13. Examples of a specific process include a black level adjustment process, a flare correction process, and a vertical streak correction process.

FIG. 4C simply illustrates the array of pixels in an R channel. Here, of three pixels, a middle pixel is called a "target pixel" to be processed, a pixel disposed to the right of the target pixel is called a "front pixel," and a pixel disposed to the left of the target pixel is called a "rear pixel." In the following description, pixels of the other channels are called likewise. As the processing order of the image signals, an image signal output by the front pixel is processed before an image signal output by the target pixel is processed. Then, an image signal output by the rear pixel is processed after the image signal output by the target pixel is processed.

The processing circuit illustrated in FIG. 4D is a circuit relevant to the R channel. However, the same processing circuits are configured for the other channels and are assumed to perform the same process. In the processing circuit, the image signals output from the pixels illustrated in FIG. 4C are indicated by only the names of the pixels to facilitate the description.

The input image signal of the R channel is delayed by a first delay unit 71c until the image signal output by a subsequent pixel is input. The image signal of the target pixel delayed by the first delay unit 71c is output to a calculation unit 71f. In a second delay unit 71d, the image signal of the front pixel delayed at the time of the input by the first delay unit 71c is further delayed. In the first delay units 71c and 71d, for example, a flip-flop is used. The image signals of the front and rear pixels are added by an addition unit 71e and the added image signal of the pixel is output to a calculation unit 71f. The calculation unit 71f performs predetermined calculation on the target pixel using the image signal obtained by adding the image signals of the front and rear pixels and outputs the calculated image signal of the target pixel.

The addition unit 71e collectively adds the image signals output from pixels with different phases, as in the front and rear pixels. At a given processing time, the image signal corresponding to the target pixel becomes an image signal corresponding to the front pixel at a subsequent processing time. For this reason, there is no distinction between the front and rear of the target pixel. The calculation of only the single channel and the pixels with different phases are assumed not to affect a place. Examples of the process performed in this way by the single-channel processing unit 71 include a defect detection process and a defect correction process.

FIGS. 5A and 5B are diagrams illustrating the details of image signal processing performed by the first multi-channel processing unit 72 and the second multi-channel processing unit 73. FIG. 5A illustrates a calculation example in which the image signal of the R channel is multiplied by the image signal of the Gb channel. FIG. 5B illustrates an example of the internal configuration of the first multi-channel processing unit 72 corresponding to the R channel. The internal configuration of the first multi-channel processing unit 72 and the internal configuration of the second multi-channel processing unit 73 corresponding to the other channels are assumed to be the same as the internal configuration of the first multi-channel processing unit 72 corresponding to the R channel.

The first multi-channel processing unit 72 and the second multi-channel processing unit 73 each perform the space process described above in Condition 3 and process the three-plate images or the Bayer images according to the information influenced from other channels (other pixels).

As illustrated in FIG. 5A, a multiplication unit 72a is provided inside the first multi-channel processing unit 72. The image signal of the R channel input to the first multi-channel processing unit 72 is mixed with an image signal of another channel (for example, the Gb channel) for calculation based on the calculation result or the set value controlled by the control unit 13. Examples of a specific process include a YC matrix process, a color conversion process, and a luminance calculation process.

The processing circuit illustrated in FIG. 5B is a circuit for the R channel, but the same processing circuit is assumed to be configured for the other channels and the same process is assumed to be performed. In the processing circuit, the image signals output from the pixels are indicated by only the names of the pixels to facilitate the description.

The input image signal of the R channel is delayed by a first delay unit 72b until the image signal output by a subsequent pixel is input. The image signal of the target pixel delayed by the first delay unit 72b is output to a multiplication unit 72e. In a second delay unit 72c, the image signal of the front pixel delayed at the time of the input by the first delay unit 72b is further delayed. In the first delay units 72b and 72d, for example, a flip-flop is used.

Multiplication units 72d to 72f separately perform processes. The multiplication unit 72d multiplies the image signal of the front pixel by a predetermined value, the multiplication unit 72e multiples the image signal of the target pixel by a predetermined value, and the multiplication unit 72f multiplies the image signal of the target pixel by a predetermined value. The image signals of the front pixel, the target pixel, and the rear pixel are added by an addition unit 72g and the added image signals of the pixels are output.

The multiplication units 72d to 72f separately process the image signals output from the pixels with different phases, as in the front pixel, the target pixel, and the rear pixel. For this reason, the front pixel, the target pixel, and the rear pixel are distinguished from each other based on the phases. Thus, the first multi-channel processing unit 72 can perform calculation including position information regarding the peripheral pixels when the first multi-channel processing unit 72 performs filter calculation or the like of the target pixel. Examples of the processes performed by the first multi-channel processing unit 72 include an aberration correction process, a resolution conversion process, and an image size conversion process.

In the signal processing circuit 7 according to the above-described embodiment, the image signals output from the image sensors having different pixel arrays are processed through the common process at the earlier stage, since the information regarding only the level direction described in Condition 1 is not influenced by the peripheral pixels. Likewise, with regard to the information regarding only the single channel (single color) described in Condition 2, image signals are also processed in the common process at the earlier stage. Further, the space process described in Condition 3 is performed and each image signal output from each image sensor is processed in a separate process at the later stage with regard to the information influenced from another channel (another pixel). Thus, by numerously performing the common process at the earlier stage, the circuit size of the signal processing circuit 7 can be reduced while preventing the image signals from deteriorating.

Even when the image signals input to the signal processing circuit 7 are the image signals output from the image sensors having the different pixel arrays, the signal lines are commonly used. By unifying the formats of the image signals in the signal processing circuit 7, the image signals are output from the signal processing circuit 7 using the same signal lines. Thus, it is possible to reduce the number of signal lines in input and output of the signal processing circuit 7.

3. Modification Example

Although the configuration in which the process is performed on the three-plate images and the Bayer images has been described in the above-described embodiment, image signals output by a combination of image sensors having other pixel arrays can also be processed, as in the signal processing circuit 7.

Note that the series of operations in the foregoing embodiments may be executed in hardware, and may also be executed in software. In the case of executing the series of operations in software, a program constituting such software may be executed by a computer built into special-purpose hardware, or alternatively, by a computer onto which programs for executing various functions are installed. For example, a program constituting the desired software may be installed and executed on a general-purpose personal computer.

Also, a recording medium storing program code of software that realizes the functionality of the foregoing embodiments may also be supplied to a system or apparatus. It is furthermore obvious that the functionality is realized by a computer (or CPU or other control apparatus) in such a system or apparatus retrieving and executing the program code stored in the recording medium.

The recording medium used to supply program code in this case may be a flexible disk, hard disk, optical disc, magneto-optical disc, CD-ROM, CD-R, magnetic tape, non-volatile memory card, or ROM, for example.

Also, the functionality of the foregoing embodiments may realized by a computer executing retrieved program code. In addition, some or all of the actual operations may be conducted on the basis of instructions from such program code by an OS or other software running on the computer. This also encompasses cases where the functionality of the foregoing embodiments is realized by such operations.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
A signal processing circuit including:
an image processing unit that performs, at an early stage, a process which is common to first image signals input using a predetermined number of signal lines in correspondence with first image sensors having a first pixel array and second image signals input using a number of signal lines different from the number of signal lines used to input the first image signals and commonly used to input the first image signals in correspondence with second image sensors having a second pixel array different from the first pixel array, and performs specific processes which are specific to the first image signals and the second image signals at a later stage;

a conversion unit that converts the second image signals subjected to the specific process according to a format of the first image signals; and
a selection unit that selects one of the first image signals subjected to the specific process and the converted second image signals and outputs the selected image signals using the predetermined number of signal lines.

(2)
The signal processing circuit according to (1), wherein the image processing unit includes
a common processing unit that performs the process common to the first and second image signals on the first image signals and the second image signals,
a first processing unit that performs a first process on the first image signals subjected to the common process, and
a second processing unit that performs a second process on the second image signals subjected to the common process.

(3)
The signal processing circuit according to (1) or (2), wherein the common processing unit changes a level of the first or second image signal by performing a process of multiplying a gain or a process of adding a predetermined value on the first or second image signal output by a specific pixel, and applies signal processing on each channel of the input first or second image signals in order.

(4)
The signal processing circuit according to any one of (1) to (3),
wherein the first processing unit performs, as the first process, a process by associating the first image signal output by the specific pixel with the first image signal output by a peripheral pixel of the specific pixel or the first image signal in another channel, and
wherein the second processing unit performs, as the second process, a process by associating the second image signal output by the specific pixel with the second image signal output by a peripheral pixel of the specific pixel or the second image signal in another channel.

(5)
An imaging device including:
a preprocessing unit that performs preprocessing on first image signals output by first image sensors having a first pixel array or second image signals output by second image sensors having a second pixel array different from the first pixel array; and
a signal processing circuit that performs a predetermined process on the first or second image signals subjected to the preprocessing,
wherein the signal processing circuit includes
an image processing unit that performs, at an early stage, a process which is common to the first image signals and the second image signals, and performs specific processes which are specific to the first image signals and the second image signals at a later stage,
a conversion unit that converts the second image signals subjected to the specific process according to a format of the first image signals, and
a selection unit that selects one of the first image signals subjected to the specific process and the converted second image signals and outputs the selected image signals using the predetermined number of signal lines.

(6)
A program for causing a computer to execute:
performing, at an early stage, a process which is common to first image signals output by first image sensors having a first pixel array and second image signals input output by second image sensors having a second pixel array different from the first pixel array, and performs specific processes which are specific to the first image signals and the second image signals at a later stage;

converting the second image signals subjected to the specific process according to a format of the first image signals; and selecting one of the first image signals subjected to the specific process and the converted second image signals and outputting the selected image signals using the predetermined number of signal lines.

What is claimed is:

1. A signal processing circuit comprising:
an image processing unit that performs, at an early stage, a process which is common to first image signals input using a predetermined number of signal lines in correspondence with first image sensors having a first pixel array and second image signals input using a number of signal lines different from the number of signal lines used to input the first image signals and commonly used to input the first image signals in correspondence with second image sensors having a second pixel array different from the first pixel array, and performs specific processes which are specific to the first image signals and the second image signals at a later stage;
a conversion unit that converts the second image signals subjected to the specific process according to a format of the first image signals; and
a selection unit that selects one of the first image signals subjected to the specific process and the converted second image signals and outputs the selected image signals using the predetermined number of signal lines.

2. The signal processing circuit according to claim 1, wherein the image processing unit includes
a common processing unit that performs the process common to the first and second image signals on the first image signals and the second image signals,
a first processing unit that performs a first process on the first image signals subjected to the common process, and
a second processing unit that performs a second process on the second image signals subjected to the common process.

3. The signal processing circuit according to claim 2, wherein the common processing unit changes a level of the first or second image signal by performing a process of multiplying a gain or a process of adding a predetermined value on the first or second image signal output by a specific pixel, and applies signal processing on each channel of the input first or second image signals in order.

4. The signal processing circuit according to claim 3,
wherein the first processing unit performs, as the first process, a process by associating the first image signal output by the specific pixel with the first image signal output by a peripheral pixel of the specific pixel or the first image signal in another channel, and
wherein the second processing unit performs, as the second process, a process by associating the second image signal output by the specific pixel with the second image signal output by a peripheral pixel of the specific pixel or the second image signal in another channel.

5. An imaging device comprising:
a preprocessing unit that performs preprocessing on first image signals output by first image sensors having a first pixel array or second image signals output by second image sensors having a second pixel array different from the first pixel array; and
a signal processing circuit that performs a predetermined process on the first or second image signals subjected to the preprocessing,
wherein the signal processing circuit includes
an image processing unit that performs, at an early stage, a process which is common to the first image signals input using a predetermined number of signal lines in correspondence with the first image sensors and the second image signals input using a number of signal lines different from the number of signal lines used to input the first image signals and commonly used to input the first image signals in correspondence with the second image sensors, and performs specific processes which are specific to the first image signals and the second image signals at a later stage,
a conversion unit that converts the second image signals subjected to the specific process according to a format of the first image signals, and
a selection unit that selects one of the first image signals subjected to the specific process and the converted second image signals and outputs the selected image signals using the predetermined number of signal lines.

6. A program in a non-transitory computer readable medium for causing a computer to execute:
performing, at an early stage, a process which is common to first image signals input using a predetermined number of signal lines in correspondence with first image sensors having a first pixel array and second image signals input using a number of signal lines different from the number of signal lines used to input the first image signals and commonly used to input the first image signals in correspondence with second image sensors having a second pixel array different from the first pixel array, and performs specific processes which are specific to the first image signals and the second image signals at a later stage;
converting the second image signals subjected to the specific process according to a format of the first image signals;
and selecting one of the first image signals subjected to the specific process and the converted second image signals and outputting the selected image signals using the predetermined number of signal lines.

* * * * *